(12) United States Patent
De la Torre et al.

(10) Patent No.: US 11,010,944 B2
(45) Date of Patent: May 18, 2021

(54) SYSTEMS AND METHODS FOR SWAPPING FACES AND FACE COMPONENTS BASED ON FACIAL RECOGNITION

(71) Applicant: Facebook, Inc., Menlo Park, CA (US)

(72) Inventors: Fernando De la Torre, Menlo Park, CA (US); Dong Huang, Pittsburgh, PA (US); Francisco Vicente Carrasco, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 152 days.

(21) Appl. No.: 15/857,200

(22) Filed: Dec. 28, 2017

(65) Prior Publication Data

US 2019/0206101 A1    Jul. 4, 2019

(51) Int. Cl.
*G06K 9/62* (2006.01)
*G06T 11/60* (2006.01)
*G06K 9/00* (2006.01)

(52) U.S. Cl.
CPC .......... *G06T 11/60* (2013.01); *G06K 9/00228* (2013.01); *G06K 9/00281* (2013.01)

(58) Field of Classification Search
CPC ............... G06K 9/00221–2009/00328; G06T 2207/30201
See application file for complete search history.

(56) References Cited

U.S. PATENT DOCUMENTS

| 7,787,664 | B2  | 8/2010  | Luo |  |
|---|---|---|---|---|
| 8,620,038 | B2* | 12/2013 | Aarabi | G06T 11/60 382/118 |
| 8,818,131 | B2* | 8/2014  | Wang | G06K 9/00 348/208.99 |
| 9,478,056 | B2* | 10/2016 | James | G06T 11/60 |
| 2005/0286799 | A1* | 12/2005 | Huang | G06K 9/00248 382/275 |
| 2006/0204055 | A1* | 9/2006  | Steinberg | H04N 5/2354 382/118 |
| 2007/0237421 | A1* | 10/2007 | Luo | G06T 11/60 382/284 |
| 2009/0252435 | A1  | 10/2009 | Wen |  |
| 2014/0112534 | A1  | 4/2014  | Sako |  |

(Continued)

FOREIGN PATENT DOCUMENTS

JP        2014067117        4/2014

OTHER PUBLICATIONS

Mahmoud Afifi et al., "Video Face Replacement System Using a Modified Poisson Blending Technique", 2014 IEEE International Symposium on Intelligent Signal Processing and Communication Systems (ISPACS) Dec. 1-4, 2014, pp. 205-210. (Year: 2014).*

(Continued)

*Primary Examiner* — Brian Werner
(74) *Attorney, Agent, or Firm* — Sheppard Mullin Richter & Hampton LLP

(57) ABSTRACT

Systems, methods, and non-transitory computer readable media can obtain a first image depicting a face of a user. A plurality of images depicting the face of the user can be identified. A second image of the plurality of images can be identified based on one or more factors. The face or a portion of the face of the user in the first image can be replaced with the face or a portion of the face of the user in the second image.

20 Claims, 8 Drawing Sheets

(56) References Cited

U.S. PATENT DOCUMENTS

| | | | |
|---|---|---|---|
| 2015/0078628 A1* | 3/2015 | Anderson | G06T 11/00 |
| | | | 382/115 |
| 2015/0117786 A1 | 4/2015 | James et al. | |
| 2018/0061010 A1* | 3/2018 | Akselrod | G06K 9/00228 |
| 2019/0122329 A1* | 4/2019 | Wang | G06K 9/66 |

OTHER PUBLICATIONS

International Application No. PCT/US2018/012101, International Search Report and Written Opinion dated Sep. 28, 2018.
European Application No. 18895242.8, Search Report dated Feb. 1, 2021, 8 pages.
Bunke, Horst, et al., "Applied Pattern Recognition", Jan. 1, 2008 (Jan. 1, 2008), Springer, P055766415, pp. 30-48.
Liu, Zicheng, et al., "Face Geometry and Appearance: Modeling Concepts and Applications", Jan. 1, 2011 (Jan. 1, 2011), Cambridge University Press, XP055766446, pp. 181-216.

* cited by examiner

500

Map facial points of a face or a portion of the face of a user in a second image to facial points of a face or a portion of the face of the user in a first image
502

Blend a portion of the first image corresponding to the face or the portion of the face of the user and a portion of the second image corresponding to the face or the portion of the face of the user
504

FIGURE 5

SYSTEMS AND METHODS FOR SWAPPING FACES AND FACE COMPONENTS BASED ON FACIAL RECOGNITION

FIELD OF THE INVENTION

The present technology relates to the field of social networks. More particularly, the present technology relates to techniques for generating various media effects based on facial recognition.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

SUMMARY

Various embodiments of the present disclosure can include systems, methods, and non-transitory computer readable media configured to obtain a first image depicting a face of a user. A plurality of images depicting the face of the user can be identified. A second image of the plurality of images can be identified based on one or more factors. The face or a portion of the face of the user in the first image can be replaced with the face or a portion of the face of the user in the second image.

In some embodiments, the one or more factors include one or more of: lighting conditions in an image, an orientation of the face of the user in an image, a resolution of an image, presence of accessories on the face of the user, or presence of makeup on the face of the user.

In certain embodiments, the plurality of images depicting the face of the user is identified from a set of images on a computing device based on facial recognition.

In an embodiment, the replacing the face or a portion of the face of the user in the first image includes mapping facial points of the face or the portion of the face of the user in the second image to facial points of the face or the portion of the face of the user in the first image.

In some embodiments, the replacing the face or a portion of the face of the user in the first image includes blending a portion of the first image corresponding to the face or the portion of the face of the user and a portion of the second image corresponding to the face or the portion of the face of the user.

In certain embodiments, the replacing the face or a portion of the face of the user in the first image is performed in real time, and the first image is image data provided in a camera view.

In an embodiment, the replacing the face or a portion of the face of the user in the first image is performed after the first image is captured.

In some embodiments, the portion of the face is a face component, and the face component includes one or more of: eyes, a nose, a mouth, or ears.

In certain embodiments, the one or more factors include a factor relating to the face component.

In an embodiment, the first image is associated with a video.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example second method for generating media effects based on facial recognition, according to an embodiment of the present disclosure.

Figure 1:
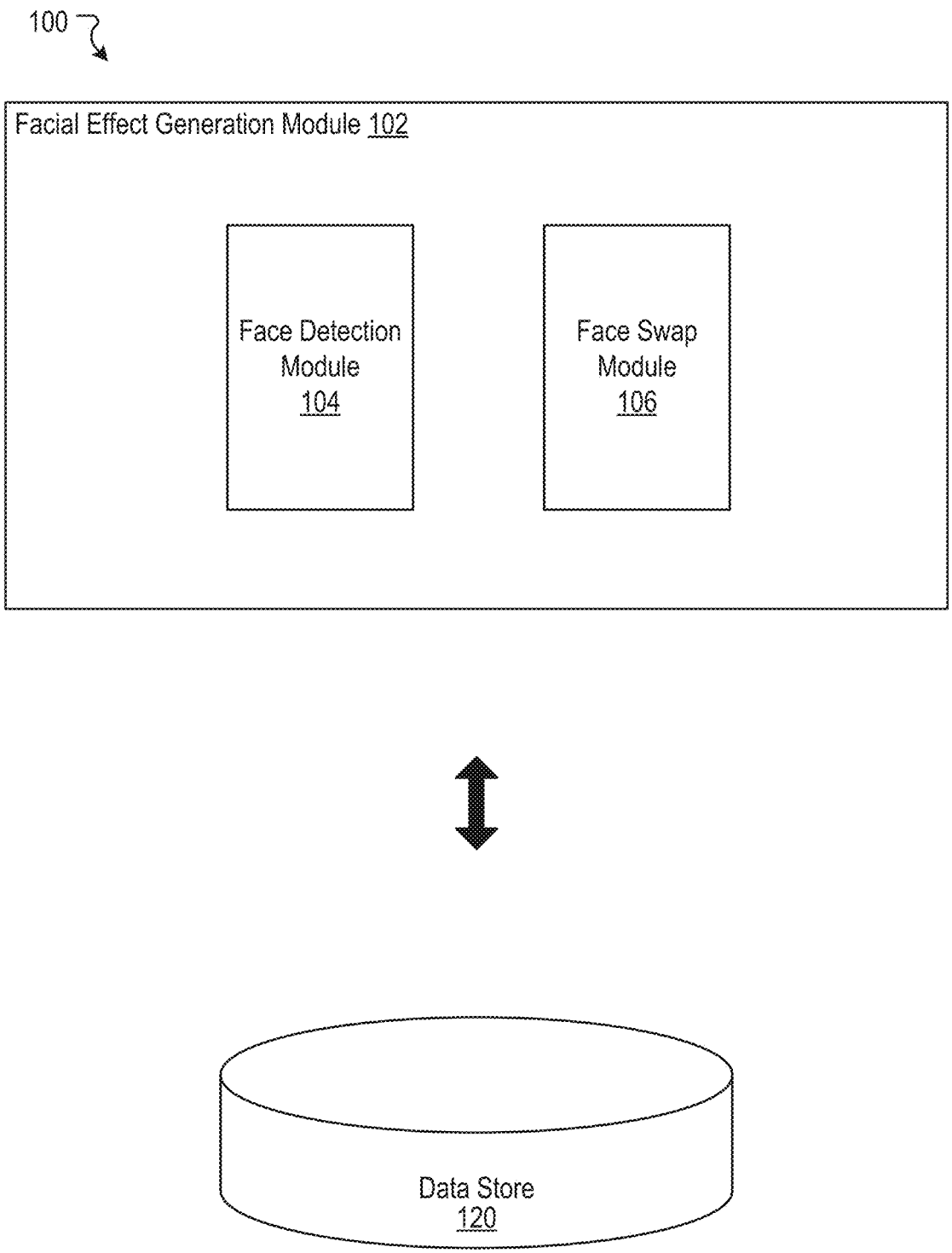
FIG. 1 illustrates an example system including an example facial effect generation module configured to generate media effects based on facial recognition, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Swapping Faces and Face Components Based on Facial Recognition

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

Users may create and upload various types of media content to a social networking system. Examples of media content can include photos, images, videos, etc. In some cases, photos of a user can be captured using a client computing device of the user. The user may prefer a first photo overall, but may like in particular the face of the user in a second photo or a portion of the face of the user in the second photo. For example, lighting conditions or an orientation of the face may be better in the second photo than in the first photo. However, under conventional approaches specifically arising in the realm of computer technology, a user may not be able to combine portions from different photos of the user. For example, the user may not be able to select the face of the user or a portion of the face from a photo and replace the face of the user or a corresponding portion of the face in another photo with the selected face or portion.

An improved approach rooted in computer technology can overcome the foregoing and other disadvantages associated with conventional approaches specifically arising in the realm of computer technology. Based on computer technology, the disclosed technology can swap faces or face components of a user in different photos based on facial recognition techniques. For example, the disclosed technology can perform facial recognition on a client computing device in order to identify photos depicting the face of a user. A specific photo of the identified photos of the user can be selected based on various factors. Examples of factors can include lighting conditions, angle or orientation, user input or selection, resolution, etc. The face of the user in the selected photo can be used to replace the face of the user in another photo. Similarly, a face component of the user in the selected photo can be used to replace a corresponding face component of the user in another photo. Examples of face components can include eyes, nose, mouth, etc. The face or a face component of the user can be swapped prior to photos are captured or after photos are captured. In this manner, the disclosed technology can allow a user to utilize the face or a face component of the user in a photo that is preferred by the user in other photos of the user. Additional details relating to the disclosed technology are provided below.

FIG. 1 illustrates an example system 100 including an example facial effect generation module 102 configured to generate media effects based on facial recognition, according to an embodiment of the present disclosure. The facial effect generation module 102 can include a face detection module 104 and a face swap module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the facial effect generation module 102 can be implemented in any suitable combinations. While the disclosed technology is described in connection with media content associated with a social networking system for illustrative purposes, the disclosed technology can apply to any other type of system and/or content. In addition, photos are discussed herein as examples of media content for illustrative purposes, but the disclosed technology can apply to any type of media content, such as images, videos, etc.

The face detection module 104 can detect or identify a face in a photo. For example, the face detection module 104 can detect facial points of a face in a photo. Facial points can also be referred to as "facial landmarks." Facial points relate to image data corresponding to anatomical points on a human face that can be automatically detected in a consistent way for different people under various conditions, such as lighting conditions, orientations, etc. For example, facial points may indicate locations of certain prominent points of lips, eyes, nose, eyebrows, chin, forehead, ears, or other facial features. Specific locations of facial points can vary depending on a particular person and can be expressed, for instance, using a selected coordinate system based on dimensions of a photo in which the facial points are depicted or subject matter depicted in the image, to name some examples. The face detection module 104 can also detect or identify a face component of a detected face. Examples of face components can include eyes, nose, mouth, ears, etc. The face detection module 104 can detect a face component based on facial points associated with a detected face. All examples herein are provided for illustrative purposes, and there can be many variations and other possibilities.

The face swap module 106 can swap faces or face components in photos. The face swap module 106 can identify a photo depicting the face of a user and swap the face or a face component of the user in another photo with the face or a corresponding face component of the user in the identified photo. Accordingly, the user can choose to provide a representation of the user that the user would like to share with others, such as a "best" representation of the user. Functionality of the face swap module 106 is described in more detail herein.

In some embodiments, the facial effect generation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the facial effect generation module 102 can be, in part or in whole, implemented as software running on one or more computing devices or systems, such as on a server system or a client computing device. In some instances, the facial effect generation module 102 can be, in part or in whole, implemented within or configured to operate in conjunction or be integrated with a social networking system (or service), such as a social networking system 630 of FIG. 6. Likewise, in some instances, the facial effect generation module 102 can be, in part or in whole, implemented within or configured to operate in conjunction or be integrated with a client computing device, such as the user device 610 of FIG. 6. For example, the facial effect generation module 102 can be implemented as or within a dedicated application (e.g., app), a program, or an applet running on a user computing device or client computing system. The application incorporating or implementing instructions for performing functionality of the facial effect generation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support of and operation of the facial effect generation module 102. The data maintained by the data store 120 can include, for example, information relating to media content, photos, images, videos, faces, face components, facial points, factors swapping for faces or face components, etc. The data store 120 also can maintain other information associated with a social networking system. The information associated with the social networking system can include data about users, social connections, social interactions, locations, geofenced areas, maps, places, events, groups, posts, communications, content, account settings, privacy settings, and a social graph. The social graph can reflect all entities of the social networking system and their interactions. As shown in the example system 100, the facial effect generation module 102 can be configured to communicate and/or operate with the data store 120. In some embodiments, the data store 120 can be a data store within a client computing device. In some embodiments, the data store 120 can be a data store of a server system in communication with the client computing device.

Figure 2:
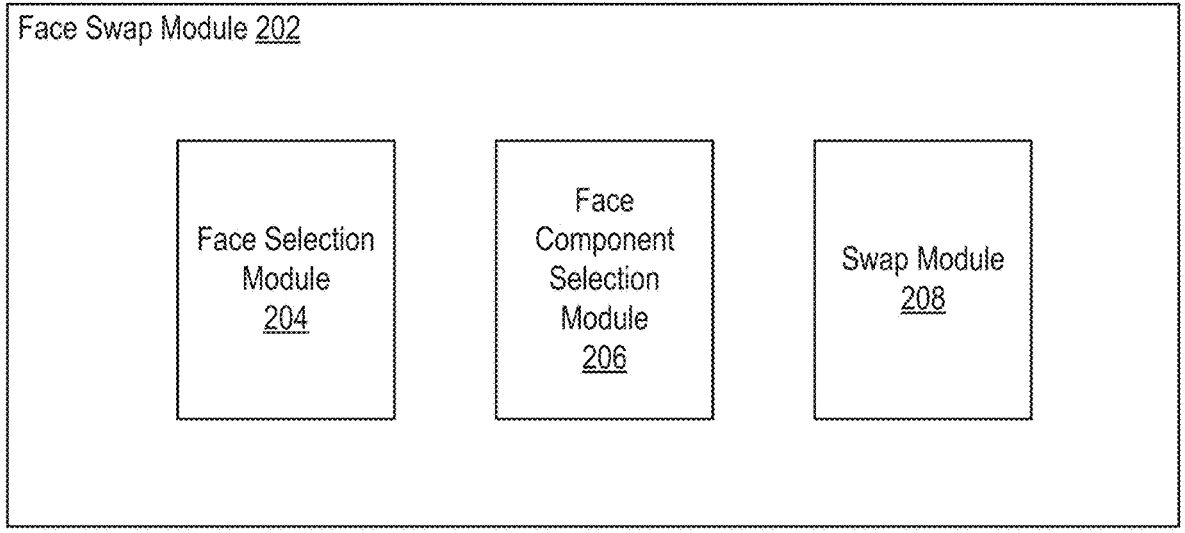
FIG. 2 illustrates an example face swap module configured to swap faces or face components in photos, according to an embodiment of the present disclosure.

FIG. 2 illustrates an example face swap module 202 configured to swap faces or face components in photos, according to an embodiment of the present disclosure. In some embodiments, the face swap module 106 of FIG. 1 can be implemented with the example face swap module 202. As shown in the example of FIG. 2, the example face swap module 202 can include a face selection module 204, a face component selection module 206, and a swap module 208.

The face selection module 204 can determine a photo depicting the face of a user that can be used to swap or replace the face or a face component of the user in other photos. As discussed herein, the photo depicting the face of a user that can be used to swap the face or a face component of the user in other photos can be referred to as a "source photo." One or more source photos can be selected from photos depicting the face of the user. In some embodiments, photos depicting the face of the user can be provided or indicated by the user. In other embodiments, conventional facial recognition techniques based on, for example, machine learning models can be performed on photos maintained on a client computing device in order to identify photos depicting the face of the user.

The face selection module 204 can identify one or more source photos for swapping faces of a user based on various factors. Examples of factors can include lighting conditions, an orientation or an angle of the face of a user, a resolution, presence of accessories, presence of makeup, etc. Many variations are possible. The lighting conditions can indicate whether an amount of lighting reflected in a photo is sufficient, a direction of lighting, a source of lighting, etc. For instance, lighting that is not too bright or too dark and is from the front can be considered to be good lighting. The face selection module 204 can determine whether brightness of lighting in a photo satisfies a threshold value, whether the direction of lighting is from the front, etc. in order to select a source photo. Regarding the orientation or the angle of the face of a user, front facing can be considered to be a good orientation or angle. The face selection module 204 can determine whether the orientation or the angle of the face is facing front in order to select a source photo. The resolution can indicate a pixel resolution of a photo. The face selection module 204 can determine whether the resolution of a photo satisfies a threshold value in order to select a source photo. The presence of accessories can indicate whether the face in a photo includes various accessories, such as glasses, jewelry, etc. For instance, a user may prefer photos depicting the face of the user without glasses. Or a user may prefer photos depicting the face of the user with glasses. The face selection module 204 may determine whether a photo depicts the face of the user with accessories, such as glasses, in order to select a source photo. The presence of makeup can indicate whether the face in a photo is wearing makeup. For instance, a user may prefer photos depicting the face of the user with makeup. Or a user may prefer photos depicting the face of the user without makeup. The face selection module 204 may determine whether a photo depicts the face of the user with makeup in order to select a source photo. In certain embodiments, the face selection module 204 can allow the user to specify preferences or values relating to the factors and identify one or more source photos based on whether or an extent to which the source photos reflect or satisfy the specified preferences or values. In this regard, a value relating to a factor can be a quantitative measure about an extent or level to which a photo reflects the factor. In other embodiments, the face selection module 204 can automatically identify one or more source photos based on default or optimal values relating to the factors. In some embodiments, the face selection module 204 can identify one or more source photos based on user input. For instance, a user can indicate a photo to use as a source photo for replacing the face of the user in another photo.

The face component selection module 206 can identify one or more source photos for swapping a face component of a user based on various factors. The factors can include one or more of the factors for identifying source photos for swapping the face of a user, as discussed above. In addition, the factors can include factors that are specific to a particular face component. For example, if the face component to be replaced is eyes, the factors can include a factor indicating whether eyes of the user in a photo are open. As another example, if the face component to be replaced is the mouth, the factors can include a factor indicating whether the mouth of the user is smiling or exhibiting a particular expression. Many variations are possible. In certain embodiments, the face component selection module 206 can allow the user to specify preferences or values relating to the factors and identify one or more source photos based on the specified preferences or values. In other embodiments, the face component selection module 206 can automatically identify one or more source photos based on whether or an extent to which the source photos reflect default or optimal values relating to the factors. In some embodiments, the face component selection module 206 can identify one or more source photos based on user input. For instance, a user can indicate a photo to use as a source photo for replacing a face component of the user in another photo.

The swap module 208 can replace the face or a face component of a user in a photo or image data with the face or a corresponding face component of the user in a source photo. As discussed herein, the photo or image data in which the face or a face component of the user is to be replaced can be referred to as a "target photo" or "target image data." The swap module 208 can replace the face of the user in a target photo or target image data with the face of the user in a source photo. In some embodiments, the swap module 208 can replace the face in a target photo with the face in a source photo after the target photo has been captured. In other embodiments, the swap module 208 can replace the face in target image data provided in a camera view with the face in a source photo prior to the target image data being captured as a photo. For example, the camera view can be provided on a client computing device of the user. In these embodiments, the swap module 208 can perform swapping of faces in real time. Accordingly, the swap module 208 can provide augmented reality (AR) effects in relation to face swapping.

The swap module 208 can replace the face in a target photo or image data by mapping facial points of the face of a user in a source photo to facial points of the face of the user in the target photo or image data. For instance, the face in the source photo and the face in the target photo may not correspond exactly. Accordingly, the swap module 208 can determine a translation that maps the facial points of the face in the source photo to the facial points of the face in the target photo or image data. The swap module 208 can blend the source photo and the target photo or image data in order to make the replaced face appear more natural and smooth. For example, the swap module 208 can blend pixel data of the source photo and the target photo or image data. The swap module 208 can blend the source photo and the target photo or image data around edges of the replaced face. The swap module 208 can also blend the source photo and the target photo or image data in order to compensate for the difference in lighting in the source photo and the target photo or image data. Many variations are possible.

Similar to replacing faces, the swap module 208 can replace a selected face component of the user in a target photo or target image data with a corresponding face component of the user in a source photo. In some embodiments, the swap module 208 can replace the face component in a target photo with the face component in a source photo after the target photo has been captured. In other embodiments, the swap module 208 can replace the face component in target image data provided in a camera view with the face component in a source photo prior to the target image data being captured as a photo. In these embodiments, the swap module 208 can perform swapping of face components in real time.

In some embodiments, target image data can be associated with a video. As an example, target image data can be a frame of a video that has been recorded. The swap module 208 can replace the face or a face component of a user in the frame of the video with the face or a corresponding face component of the user in a source photo. As another example, target image data can be image data in a camera view. The swap module 208 can replace the face or a face component of a user in the image data with the face or a corresponding face component of the user in a source photo before the image data is recorded as a frame of a video.

The swap module 208 can replace the face or a face component of a user for various scenarios. In some embodiments, the swap module 208 can swap faces or face components of a user during a video conference. The face or face component of a user in image data that is transmitted during a video conference can be replaced. In certain embodiments, the swap module 208 can swap faces or face components of a user after the user has uploaded a photo or a video of the user to a social networking system. In some embodiments, the swap module 208 may swap faces or face components of multiple users in a photo or a video. For example, the multiple users can each grant permission to replace their faces or face components in the photo or the video. Similarly, a user associated with the photo or the video, such as a publisher of the photo or the video, can grant permission for face swapping related edits to the photo or the video. Many variations are possible.

Figure 3A:
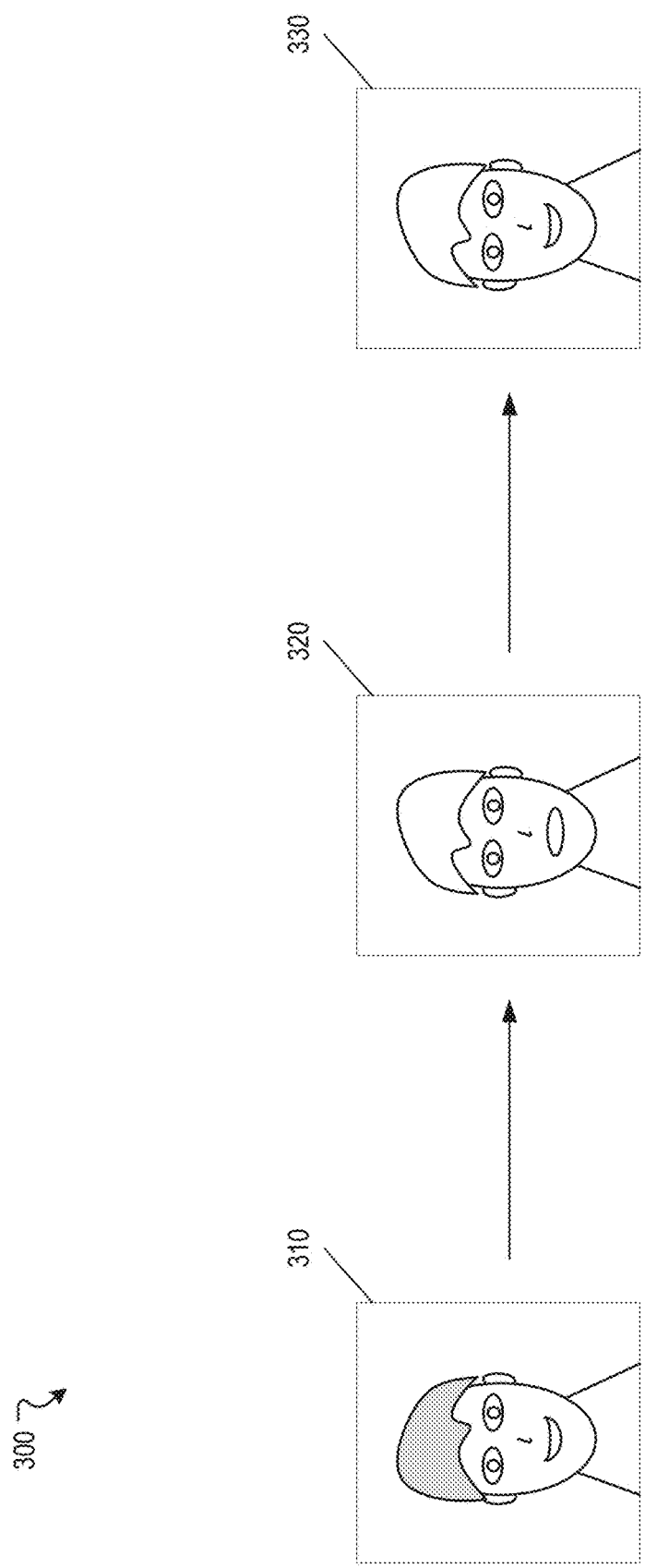
FIG. 3A illustrates an example scenario for swapping faces in photos, according to an embodiment of the present disclosure.

FIG. 3A illustrates an example scenario 300 for swapping faces in photos, according to an embodiment of the present disclosure. In the example scenario 300, a source photo 310 depicting the face of a user is identified. The source photo 310 can be identified based on various factors as described above. The face of the user in a target photo 320 can be replaced with the face of the user in the source photo 310 in order to generate a photo 330. The photo 330 can be generated from the source photo 310 and the target photo 320 by the facial effect generation module 102, as discussed herein. The photo 330 can depict the user as in the target photo 320 with the face of the user replaced with the face of the user in the source photo 310. For example, facial points of the face of the user in the source photo 310 can be mapped to facial points of the face of the user in the target photo 320. A portion of the source photo 310 corresponding to the face and a portion of the target photo 320 corresponding to the face can be blended to make the photo 330 look natural or smooth. In some embodiments, the face in the target photo 320 can be replaced directly within the target photo 320 without generating a separate photo 330. All examples herein are provided for illustrative purposes, and there can be many variations and other possibilities.

Figure 3B:
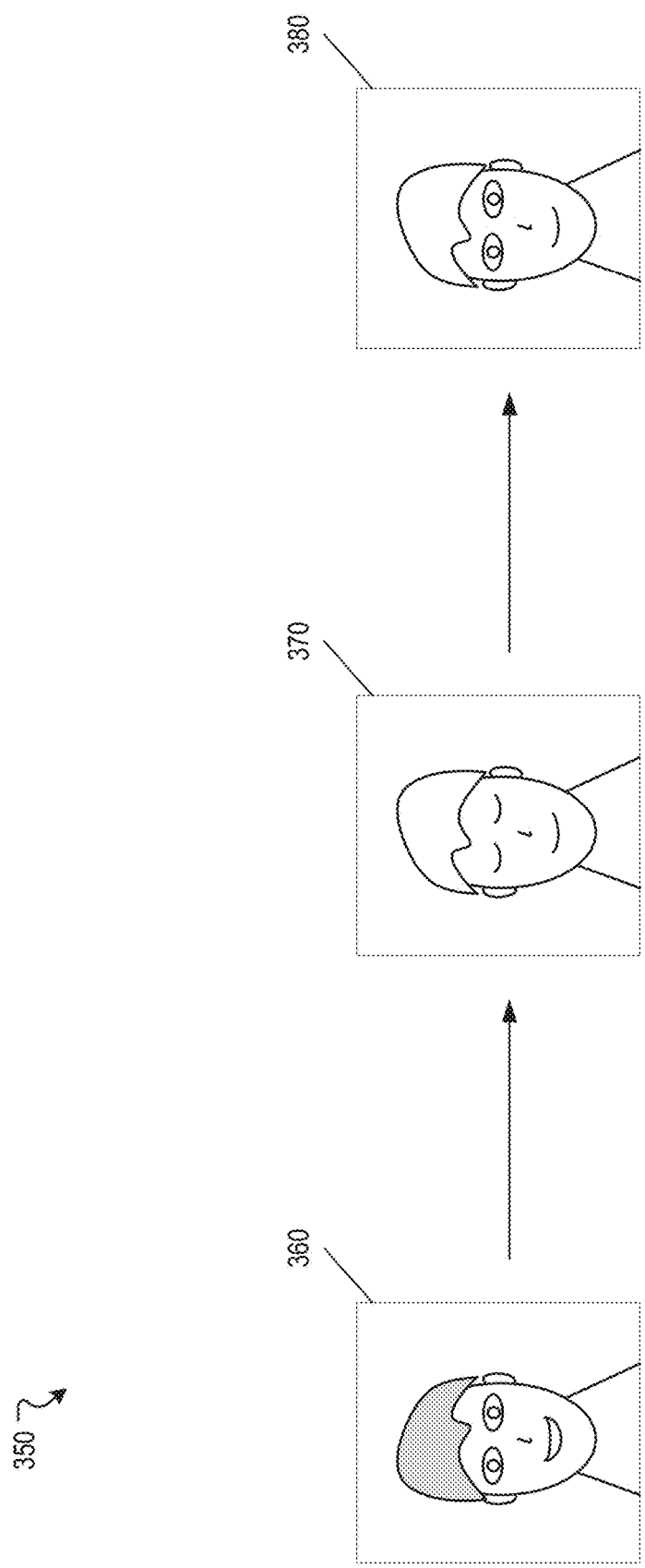
FIG. 3B illustrates an example scenario for swapping face components in photos, according to an embodiment of the present disclosure.

FIG. 3B illustrates an example scenario 350 for swapping face components in photos, according to an embodiment of the present disclosure. In the example scenario 350, a source photo 360 depicting the face of a user is identified. The source photo 360 can be identified based on various factors as described above. A target photo 370 depicts the face of the user. In the example scenario 350, eyes of the user are closed in the target photo 370. The user may wish to replace the eyes of the user in the target photo 370 with eyes of the user that are open in another photo, such as the source photo 360. Accordingly, a face component of the user, such as eyes, in the target photo 370 can be replaced with a corresponding face component of the user in the source photo 360 to generate a photo 380. The photo 380 can depict the user as in the target photo 370 with the face component of the user replaced with the face component of the user in the source photo 360. The photo 380 can be generated from the source photo 360 and the target photo 370 by the facial effect generation module 102, as discussed herein. For example, facial points of the face component in the source photo 360 can be mapped to facial points of the face component in the target photo 370. A portion of the source photo 360 corresponding to the face component and a portion of the target photo 370 corresponding to the face component can be blended to make the photo 380 look natural or smooth. In some embodiments, a face component in the target photo 370 can be replaced directly within the target photo 370 without generating a separate photo 380. All examples herein are provided for illustrative purposes, and there can be many variations and other possibilities.

Figure 4:
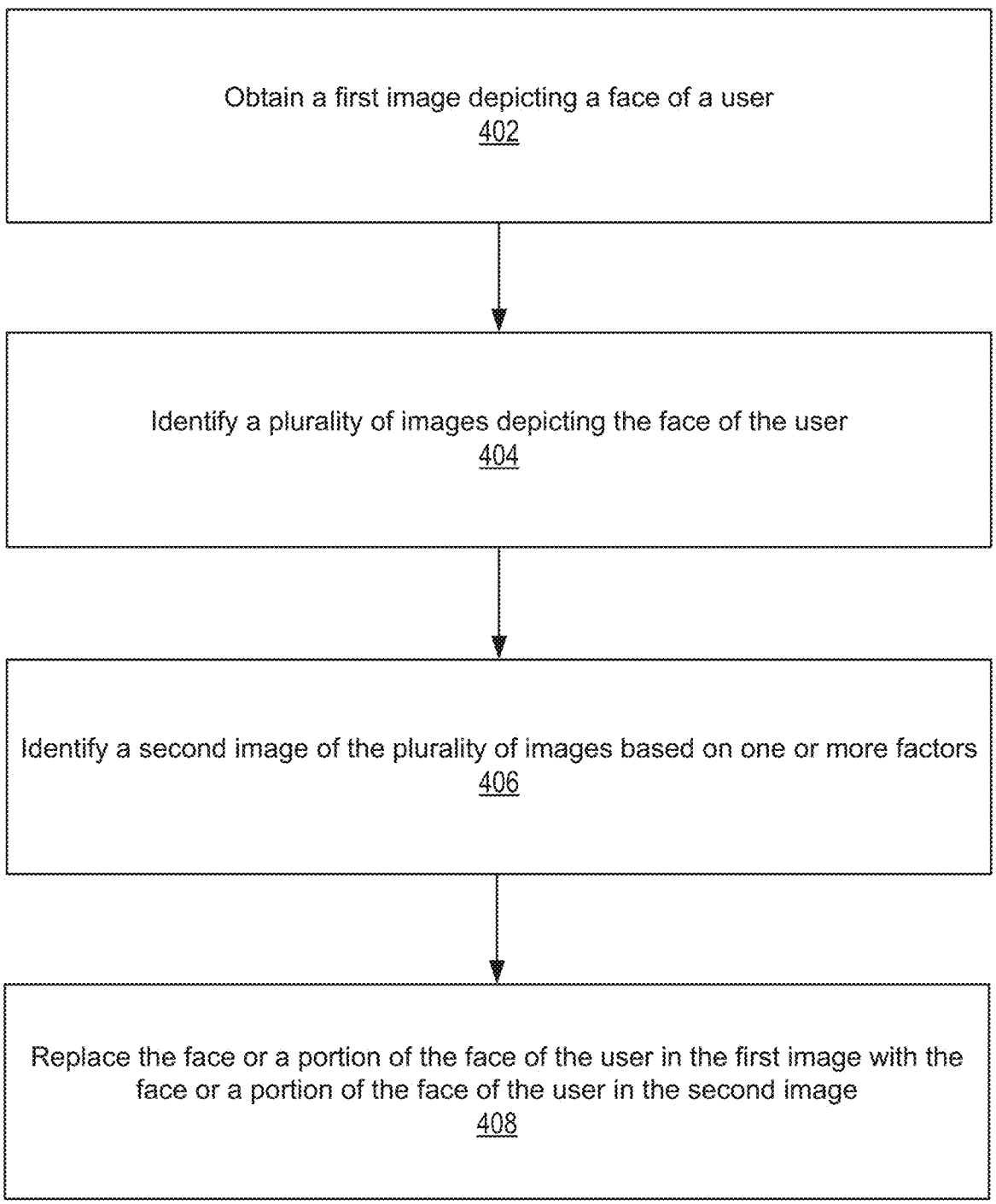
FIG. 4 illustrates an example first method for generating media effects based on facial recognition, according to an embodiment of the present disclosure.

FIG. 4 illustrates an example first method 400 for generating media effects based on facial recognition, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain a first image depicting a face of a user. At block 404, the example method 400 can identify a plurality of images depicting the face of the user. At block 406, the example method 400 can identify a second image of the plurality of images based on one or more factors. At block 408, the example method 400 can replace the face or a portion of the face of the user in the first image with the face or a portion of the face of the user in the second image. Other suitable techniques that incorporate various features and embodiments of the present disclosure are possible.

FIG. 5 illustrates an example second method 500 for generating media effects based on facial recognition, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can map facial points of a face or a portion of the face of a user in a second image to facial points of a face or a portion of the face of the user in a first image. At block 504, the example method 500 can blend a portion of the first image corresponding to the face or the portion of the face of the user and a portion of the second image corresponding to the face or the portion of the face of the user. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
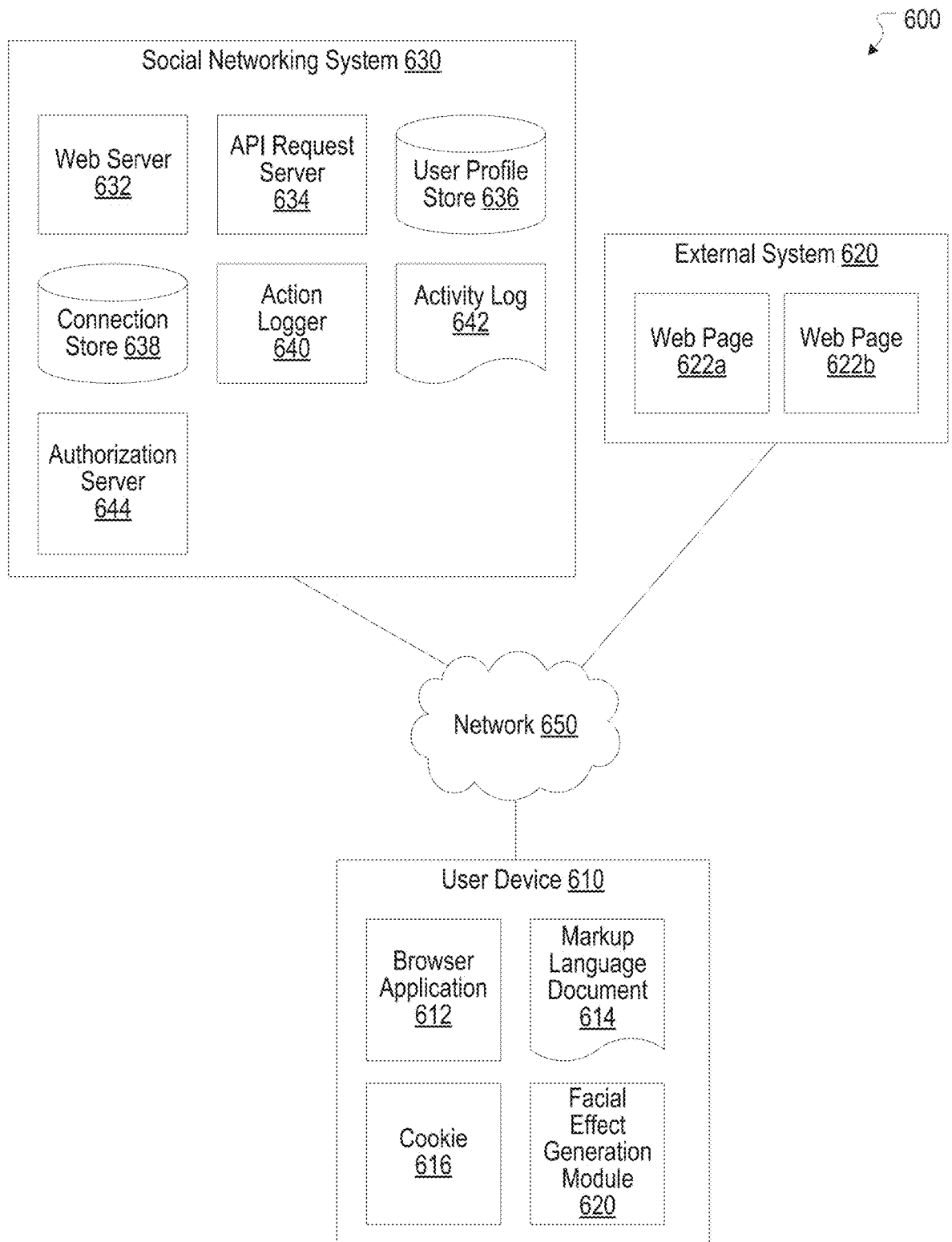
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a facial effect generation module 620. The facial effect generation module 620 can be implemented with the facial effect generation module 102, as discussed in more detail herein. In some embodiments, one or more functionalities of the facial effect generation module 620 can be implemented in the social networking system 630.

Hardware Implementation

Figure 7:
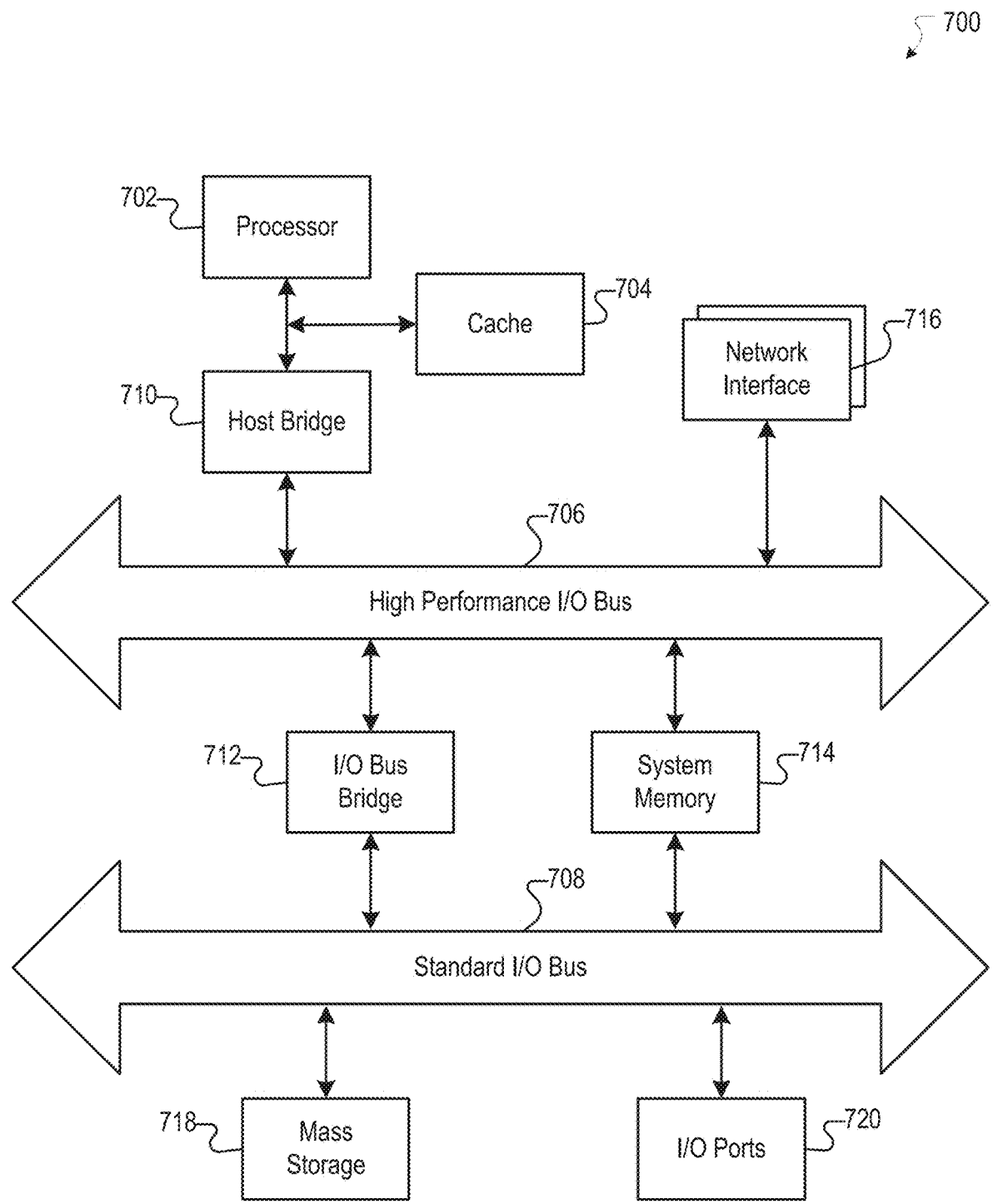
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, for a first user, image data in a camera view for capture as a photo, wherein the image data includes a face of a second user different from the first user;
   identifying, by the computing system, a plurality of images depicting the face of the second user, wherein the plurality of images were indicated by the second user to be used as a source for replacement of the face or portions of the face in images;
   identifying, by the computing system, an image of the plurality of images based at least in part on a user preference of the second user associated with depiction of facial accessories and based at least in part on one or more factors, wherein the one or more factors include at least one of: an amount of lighting, a direction of lighting, an image resolution, or a presence of makeup on the face;
   replacing, by the computing system, at least one of: the face or a portion of the face of the second user in the image data with at least one of: the face or a portion of the face of the second user in the identified image; and
   capturing, by the computing system, the photo based at least in part on the image data and at least one of: the replaced face or the replaced portion of the face of the second user in the identified image, wherein permission for edits to the face of the second user in the captured photo after the capturing is granted by the second user in the captured photo.

2. The computer-implemented method of claim 1, wherein the one or more factors further include one or more of: lighting conditions or an orientation of the face of the second user.

3. The computer-implemented method of claim 1, wherein the plurality of images depicting the face of the second user is identified from a set of images on a computing device based on facial recognition.

4. The computer-implemented method of claim 1, wherein the replacing the face or a portion of the face of the second user in the image data includes mapping facial points of the face or the portion of the face of the second user in the image of the plurality of images to facial points of the face or the portion of the face of the second user in the image data.

5. The computer-implemented method of claim 1, wherein the replacing the face or a portion of the face of the second user in the image data includes blending a portion of the image data corresponding to the face or the portion of the face of the second user and a portion of the image of the plurality of images corresponding to the face or the portion of the face of the second user.

6. The computer-implemented method of claim 1, wherein the replacing the face or a portion of the face of the second user in the image data is performed in real time.

7. The computer-implemented method of claim 1, wherein the replacing the face or a portion of the face of the second user in the image data is based at least in part on whether the second user has granted permission for face swapping.

8. The computer-implemented method of claim 1, wherein the portion of the face of the second user is a face component, and the face component includes one or more of: eyes, a nose, a mouth, or ears.

9. The computer-implemented method of claim 8, wherein the one or more factors further include a factor relating to the face component.

10. The computer-implemented method of claim 1, wherein the image data is associated with a video.

11. A system comprising:
    at least one hardware processor; and
    a memory storing instructions that, when executed by the at least one processor, cause the system to perform:
       obtaining, for a first user, image data in a camera view for capture as a photo, wherein the image data includes a face of a second user different from the first user;
       identifying a plurality of images depicting the face of the second user, wherein the plurality of images were indicated by the second user to be used as a source for replacement of the face or portions of the face in images;
       identifying an image of the plurality of images based at least in part on a user preference of the second user associated with depiction of facial accessories and based at least in part on one or more factors, wherein the one or more factors include at least one of: an amount of lighting, a direction of lighting, an image resolution or a presence of makeup on the face;
       replacing the face or a portion of the face of the second user in the image data with the face or a portion of the face of the second user in the identified image; and
       capturing the photo based at least in part on the image data and at least one of: the replaced face or the replaced portion of the face of the second user in the identified image, wherein permission for edits to the face of the second user in the captured photo after the capturing is granted by the second user in the captured photo.

12. The system of claim 11, wherein the one or more factors further include one or more of: lighting conditions, or an orientation of the face of the second user.

13. The system of claim 11, wherein the replacing the face or a portion of the face of the second user in the image data includes mapping facial points of the face or the portion of the face of the second user in the image of the plurality of images to facial points of the face or the portion of the face of the second user in the image data.

14. The system of claim 11, wherein the replacing the face or a portion of the face of the second user in the image data includes blending a portion of the image data corresponding to the face or the portion of the face of the second user and a portion of the image of the plurality of images corresponding to the face or the portion of the face of the second user.

15. The system of claim 11, wherein the portion of the face of the second user is a face component, and the face component includes one or more of: eyes, a nose, a mouth, or ears.

16. A non-transitory computer readable medium including instructions that, when executed by at least one hardware processor of a computing system, cause the computing system to perform a method comprising:
   obtaining, for a first user, image data in a camera view for capture as a photo, wherein the image data includes a face of a second user different from the first user;
   identifying a plurality of images depicting the face of the second user, wherein the plurality of images were indicated by the second user to be used as a source for replacement of the face or portions of the face in images;
   identifying an image of the plurality of images based at least in part on a user preference of the second user associated with depiction of facial accessories and based at least in part on one or more factors, wherein the one or more factors include at least one of: an amount of lighting, a direction of lighting, an image resolution, or a presence of makeup on the face;
   replacing at least one of: the face or a portion of the face of the second user in the image data with at least one of: the face or a portion of the face of the second user in the identified image; and
   capturing the photo based at least in part on the image data and at least one of: the replaced face or the replaced portion of the face of the second user in the identified image, wherein permission for edits to the face of the second user in the captured photo after the capturing is granted by the second user in the captured photo.

17. The non-transitory computer readable medium of claim 16, wherein the one or more factors further include one or more of: lighting conditions, or an orientation of the face of the second user.

18. The non-transitory computer readable medium of claim 16, wherein the replacing the face or a portion of the face of the second user in the image data includes mapping facial points of the face or the portion of the face of the second user in the image of the plurality of images to facial points of the face or the portion of the face of the second user in the image data.

19. The non-transitory computer readable medium of claim 16, wherein the replacing the face or a portion of the face of the second user in the image data includes blending a portion of the image data corresponding to the face or the portion of the face of the second user and a portion of the image of the plurality of images corresponding to the face or the portion of the face of the second user.

20. The non-transitory computer readable medium of claim 16, wherein the portion of the face of the second user is a face component, and the face component includes one or more of: eyes, a nose, a mouth, or ears.

* * * * *